(12) United States Patent  (10) Patent No.: US 8,005,340 B2
Shimoda et al.  (45) Date of Patent: Aug. 23, 2011

(54) DATA RECORDING APPARATUS

(75) Inventors: Nozomu Shimoda, Ninomiya (JP);
Tsutomu Usui, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1020 days.

(21) Appl. No.: 11/850,738

(22) Filed: Sep. 6, 2007

(65) Prior Publication Data

US 2008/0063383 A1  Mar. 13, 2008

(30) Foreign Application Priority Data

Sep. 8, 2006  (JP) .................................. 2006-243536

(51) Int. Cl.
*H04N 5/77* (2006.01)
*H04N 5/775* (2006.01)
*H04N 5/93* (2006.01)
*H04N 5/92* (2006.01)
*G11B 27/00* (2006.01)

(52) U.S. Cl. ........ 386/224; 386/230; 386/239; 386/279; 386/326

(58) Field of Classification Search .................. 386/224, 386/230, 239–262, 291–299, 326–342
See application file for complete search history.

(56) References Cited

U.S. PATENT DOCUMENTS

| 2002/0186957 | A1* | 12/2002 | Yuen | 386/46 |
| 2006/0140583 | A1* | 6/2006 | Joh et al. | 386/83 |
| 2006/0188236 | A1* | 8/2006 | Kitagawa | 386/112 |

FOREIGN PATENT DOCUMENTS

| JP | 2000-113592 | 4/2000 |
| JP | 2002-027434 | 1/2002 |
| JP | 2002-358166 | 12/2002 |
| JP | 2003-091399 | 3/2003 |
| JP | 2003-109300 | 4/2003 |
| JP | 3097988 | 9/2003 |
| JP | 2004-056741 | 2/2004 |
| JP | 2004-326933 | 11/2004 |
| JP | 2005-108339 | 4/2005 |
| JP | 2005-182864 | 7/2005 |
| JP | 2006-236478 | 9/2006 |

\* cited by examiner

*Primary Examiner* — Thai Tran
*Assistant Examiner* — Hung Q Dang
(74) *Attorney, Agent, or Firm* — Antonelli, Terry, Stout & Kraus, LLP.

(57) ABSTRACT

Related arts have failed to realize a data recording/reproducing apparatus having the ability to, while video-audio data is being recorded in a first recording medium, notify a user of the number of second recording media to which the recorded video-audio data is equivalent. For breaking through the situation, a data recording/reproducing apparatus in accordance with the present invention includes a module which monitors an amount of video-audio data recorded in a first recording medium, and a module which displays an equivalent of the amount of recorded video-audio data in terms of the capacity of a second recording medium.

7 Claims, 9 Drawing Sheets

| EQUIVALENT NUMBER OF DVDS | FIRST DVD | SECOND DVD | THIRD DVD | FOURTH DVD |
|---|---|---|---|---|
| START POSITION | 0:00:00 | 0:30:00 | 1:00:00 | 1:30:00 |
| END POSITION | 0:30:00 | 1:00:00 | 1:30:00 | 2:00:00 |

FIG.7-a
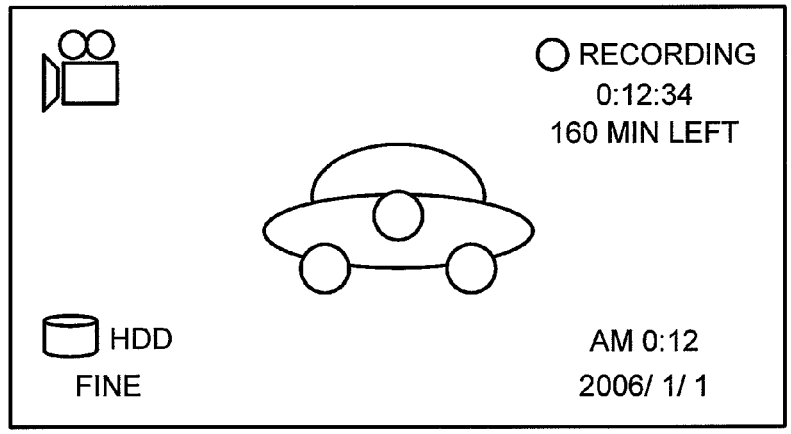
FIG.7-b
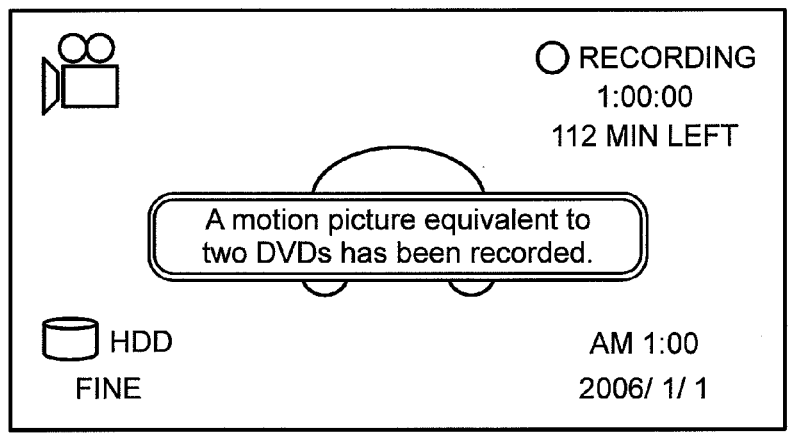
FIG.7-c
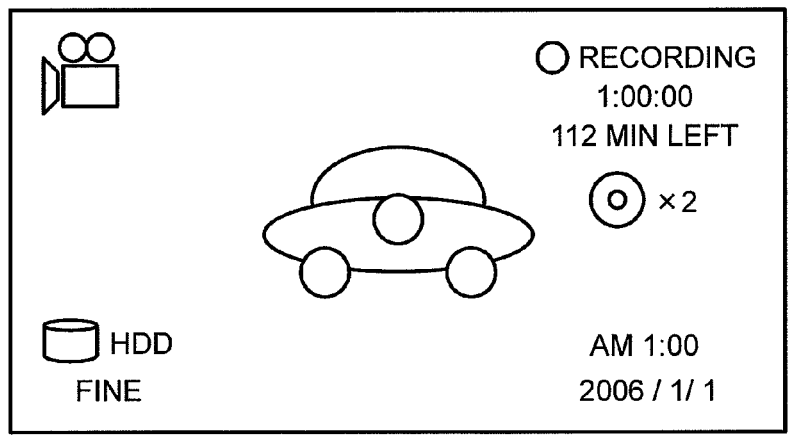

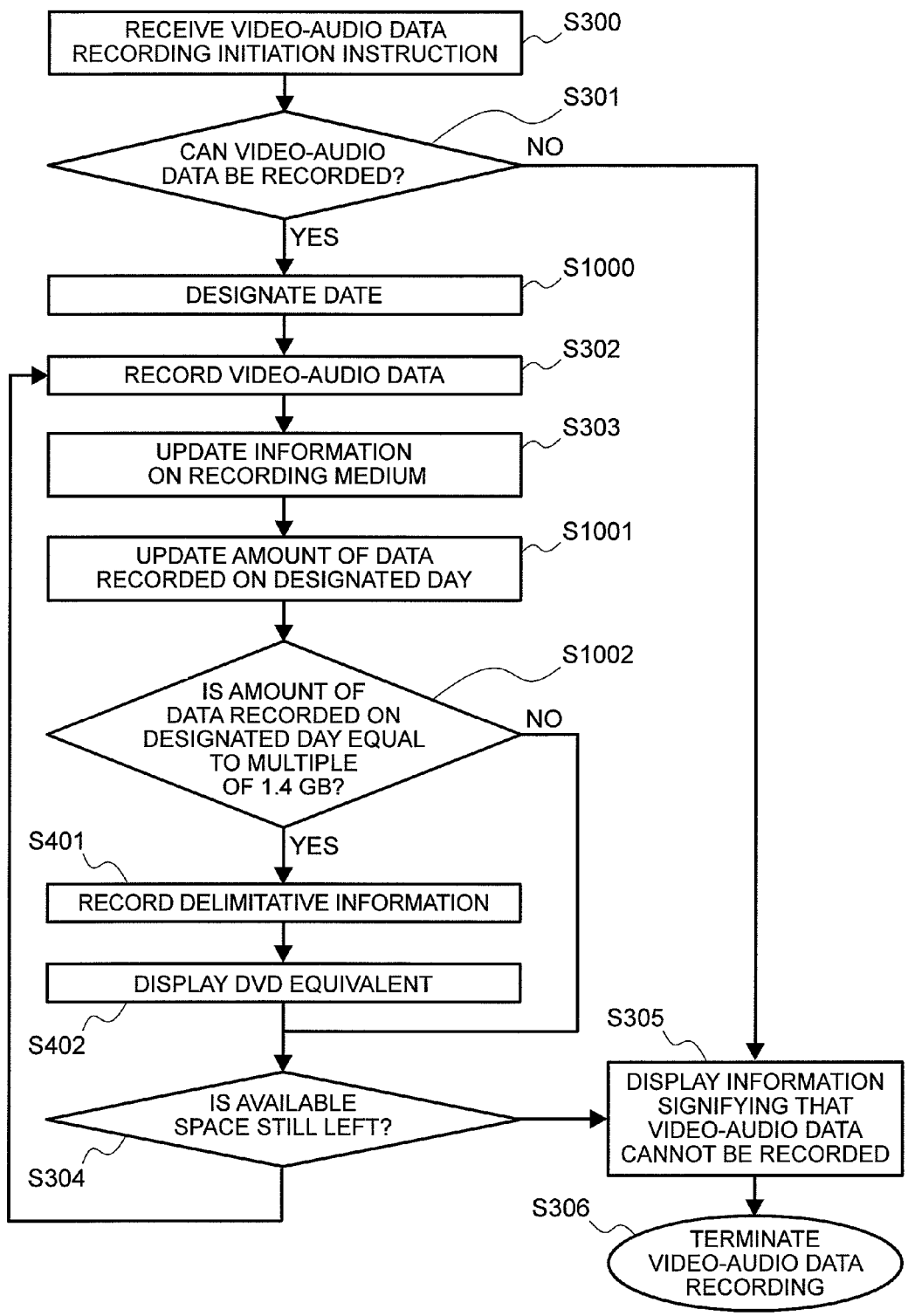

DATA RECORDING APPARATUS

CLAIM OF PRIORITY

The present application claims priority from Japanese application serial No. JP 2006-243536, filed on Sep. 8, 2006, the content of which is hereby incorporated by reference into this application.

BACKGROUND OF THE INVENTION

1. Field of the Invention

The present invention relates to a data recording apparatus, or more particularly, to a data recording apparatus that records data in a plurality of recording media.

2. Description of the Related Art

As a data recording apparatus that records data in a plurality of recording media, there is, for example, an apparatus disclosed in Japanese Unexamined Patent Application Publication No. 2005-182864.

Japanese Unexamined Patent Application Publication No. 2005-182864 has disclosed a recording/reproducing apparatus having the ability to copy data from a first recording medium to a second recording medium.

SUMMARY OF THE INVENTION

In recent years, a video camera adopting a disk medium represented by a digital versatile disk (DVD) has made its debut as a recording medium. The recognition of the DVD camera has deepened because there is no concern about overwriting and it is easy to reproduce or retrieve recorded video-audio data. The market for the DVD camera is expanding. Moreover, the DVD camera has the merits that quality will not deteriorate and that the DVD camera is readily portable. On the other hand, the storage capacity of the DVD cannot be said to be large enough to record video-audio data in a camera. For example, one DVD can record video-audio data equivalent to only about 30 min.

By the way, the storage capacity of compact hard disk drives is increasing year by year. A camera adopting the hard disk drive as a recording medium for video-audio data, that is, a so-called hard disk camera has made its debut. Compared with the DVD, the hard disk drive has a large storage capacity, and has the merit of permitting recording of data in a camera for a prolonged period of time. Further, owing to the large storage capacity, the hard disk drive has the merit that video-audio data whose quality is higher than it conventionally is can be recorded therein. On the other hand, since the hard disk drive is expensive, it is generally incorporated in a camera. Therefore, unlike the DVD camera, it is not easy to carry recorded data. Moreover, even when the hard disk drive is said to have a large storage capacity, the capacity is finite. Therefore, supposing the capacity is used up for recording, unless unnecessary video-audio data is deleted, new video-audio data cannot be recorded. Namely, video-audio data recorded in the hard disk drive is not regarded as data to be preserved.

Conceivable is a video camera including two recording media, that is, a DVD and a hard disk drive. The video camera can make the most of both the merits of the large storage capacity offered by the hard disk drive and the ease of the DVD to be carried and preserve data. At this time, when the video camera has the ability to dub video-audio data, which is recorded in the hard disk drive, into the DVD, the video camera will be found user-friendly. The video-audio data recorded by the camera is often precious data representing scenes that will never occur again. Consequently, a user dubs the video-audio data, which is recorded in the hard disk drive, into the DVD for the purpose of preservation. The user will always be conscious of the number of DVDs to which the video-audio data recorded in the hard disk drive is equivalent.

However, according to related arts, while video-audio data is being recorded in a hard disk drive, a user cannot learn to how many DVDs recorded video-audio data is equivalent. This is rather unfriendly to the user.

In order to break through the foregoing situation, for example, while video-audio data is being recorded in a first medium (for example, a hard disk), a user is notified of the number of second media (optical disks) to which the data recorded in the first medium is equivalent.

BRIEF DESCRIPTION OF THE DRAWINGS

These and other features, objects and advantages of the present invention will become more apparent from the following description when taken in conjunction with the accompanying drawings wherein:

FIG. 7 shows an example of display for notifying a DVD equivalent during recording of a motion picture;

FIG. 10 shows an example of a processing flow for notifying a DVD equivalent with a date designated.

DESCRIPTION OF THE PREFERRED EMBODIMENTS

An example of a preferred embodiment of the present invention will be described below. A description will be made using a digital video camera (which hereinafter may be simply called a video camera), in which a hard disk drive (hereinafter a HDD) and a digital versatile disk (DVD) drive are incorporated, as a data recording apparatus.

The present invention will prove effective especially in video cameras requested to meet such situations that: since imaging and a pause are repeated frequently, respective scenes are shorter than a broadcast program or the like; pictures are, unlike broadcast programs, often preserved in the order that they are picked up (broadcast programs are not preserved in the order that they are recorded but, for example, broadcast programs of a certain title are often reserved); since many housewives image their children, ease of operation is requested; there is difficulty in incorporating a large-size hard disk in a portable camera; and picked up pictures have to be readily reproduced by a player. However, the present invention will also prove effective in stationary DVD recorders or any other products.

The present invention is not limited to the DVD but may be applied to other optical disks, for example, a Blu-ray disk and a high-definition (HD) DVD. Moreover, the present invention is not limited to the combination of a HDD and an optical disk but may be applied to the combination of, for example, the HDD and a semiconductor memory or the optical disk and semiconductor memory.

Figure 1:
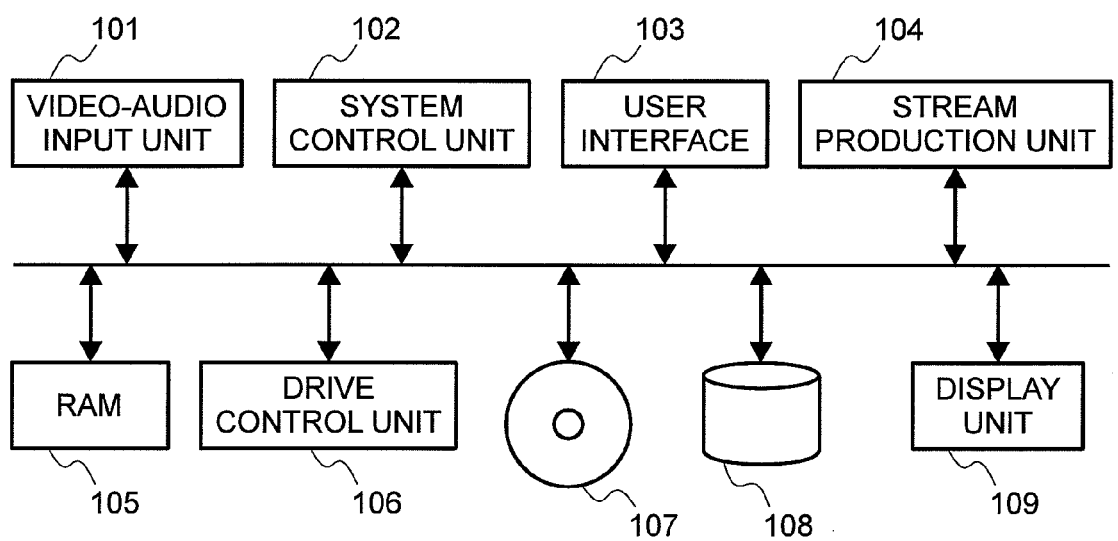
FIG. 1 is a block diagram showing an example of the configuration of a data recording/reproducing apparatus.

FIG. 1 is a block diagram showing an example of the configuration of a video camera. In FIG. 1, there is shown a video-audio input unit 101 such as a charge-coupled device (CCD) or a microphone. A system control unit 102 includes a central processing unit (CPU) and a memory and controls an entire system. A user interface 103 receives information entered when a user manipulates buttons or the like. A stream production unit 104 produces a program stream by compressing video data and audio data, which are fetched by the video-audio input unit 101, and multiplexing them. In a random access memory (RAM) 105, a program stream produced by the stream production unit 104 is accumulated or various control programs are saved. Reference numeral 107 denotes a DVD, and reference numeral 108 denotes an HDD. Now, in the present embodiment, the HDD 108 has a diameter of 1.8 inches and a storage capacity of 8 gigabytes and the DVD 107 has a diameter of 8 cm. The storage capacity of a DVD-RAM is approximately 1.4 gigabytes in one layer. A drive control unit 106 controls access to the DVD 107 or HDD 108. A display unit 109 includes a liquid crystal display (LCD) and an electric viewfinder (EVF). Incidentally, the display unit 109 may be realized with any display other than the LCD, such as, an electroluminescent display (ELD). The LCD and EVF included in the display unit 109 may be discriminated from each other as a lateral display unit and a viewfinder. Facilities included in a typical video camera, such as, a decompression block to be used to reproduce a picture, a loudspeaker that radiates sounds, and a D/A converter shall be included, though they are not shown.

To begin with, actions to be performed to record video data-audio data in the video camera in accordance with the present embodiment will be described below. Now, a description will be made of a case where the video-audio data is recorded in the HDD 108.

When a user instructs initiation of recording video-audio data through the user interface 103, the system control unit 102 begins controlling the video-audio input unit 101. The video-audio input unit 101 fetches video-audio data including video data and audio data, and converts them into digital signals. The stream production unit 104 compresses and encodes the resultant video-audio signal including a video signal and an audio signal according to the moving picture experts group 2 (MPEG2) format or the like so as to produce a stream. The produced stream is accumulated in the RAM 105. The drive control unit 106 monitors the number of accumulated streams, and extends control so that when the number of accumulated streams exceeds an arbitrary threshold, data will be written in the HDD 108.

Figure 2:
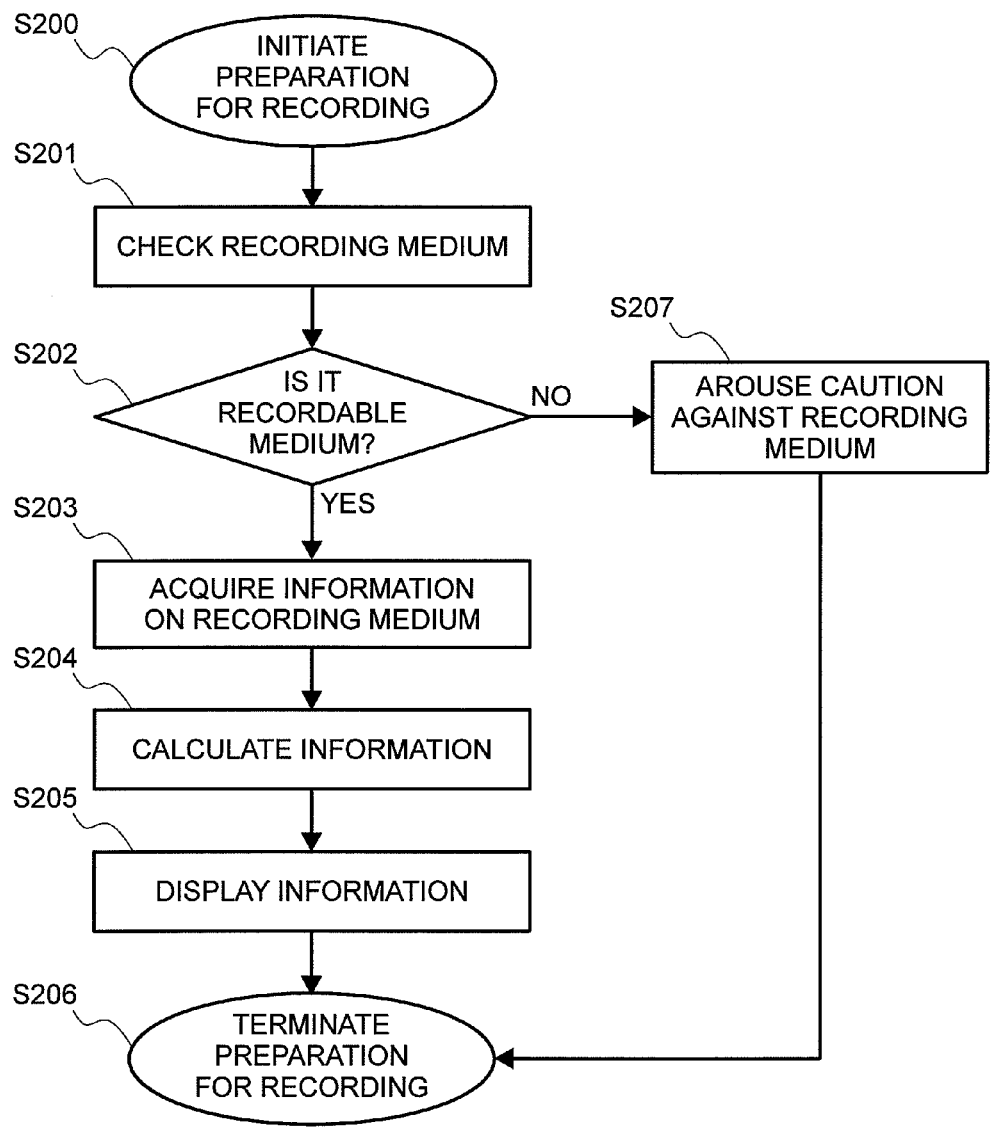
FIG. 2 shows an example of a processing flow for preparing for video-audio data recording.

Referring to FIG. 2, actions to be performed for preparing for recording when the power supply of the video camera in accordance with the present embodiment is turned on will be described below. For the present embodiment, how to turn on the power supply is not especially described. However, a transition can be made from a state, in which the power supply is off, to a state, in which recording a motion picture or a still image can be initiated, in response to an instruction which a user gives through the user interface 103. Moreover, a facility that receives necessary power from a power supply unit (not shown) at the time of making the transition shall be included in the video camera.

When the power supply is turned on, preparation for recording is initiated at step S200 shown in FIG. 2. At step S201, the condition of a recording medium loaded in the video camera is checked. Specifically, the loaded recording medium is checked to see if data can be recorded in the recording medium. For example, the recording medium is checked to see if the recording medium is of a type usable for the video camera in accordance with the present embodiment or if the recording medium is neither flawed nor broken so that data can be correctly written in or read from the recording medium. The recording medium to be checked varies depending on a recording mode which a user selects at the time of turning on the power. Specifically, as far as the video camera in accordance with the present embodiment is concerned, two recording media of the DVD 107 and HDD 108 are usable. In whichever of the recording media data is recorded varies depending on the recording mode. When a mode in which data is recorded in the HDD 108 is selected, the condition of the HDD 108 is checked at step S201. When a mode in which data is recorded in the DVD 107 is selected, the condition of the DVD 107 is checked. Incidentally, a method of checking the condition of a recording medium and the timing thereof are not limited to the foregoing ones. For example, when the mode in which data is recorded in the HDD 108 is selected, not only the HDD 108 but also the DVD 107 may be checked. Consequently, for example, video-audio data recorded in the HDD 108 can be smoothly dubbed into the DVD 107. Naturally, the DVD 107 may be checked at the time of initiating dubbing. In the example shown in FIG. 2, the recording mode for the HDD 108 is selected, and the condition of the HDD 108 alone is checked.

At step S202, the result of step S201 is checked. If the HDD 108 is in a recordable condition, control is passed to step S203. Detailed information on the HDD 108 is acquired. Information to be acquired includes, for example, the number of scenes recorded in the HDD 108, an amount of data, and an available space.

At step S204, various pieces of information are calculated based on the information acquired at step S203. Specifically, a time needed to record a motion picture is calculated based on information acquired at step S203 such as the available space of the HDD 108 and a selected bit rate at which the motion picture is recorded. For example, when a case where the bit rate at which a motion picture is recorded is high is compared with a case where the bit rate is low, assuming that the available space in the HDD 108 that is a recording destination is the same between both the cases, since the amount of video-audio data capable of being recorded is larger in the case where the bit rate is high, the time needed to record a motion picture is shorter.

At step S205, various pieces of information acquired or calculated at the previous steps are displayed on an on-screen display (OSD). Thereafter, at step S206, preparation for recording is terminated.

On the other hand, if the result of step S202 demonstrates that data cannot be recorded in the HDD 108, control is passed to step S207. Information "The HDD may be broken." is displayed for a user, and processing is terminated at step S206.

In the foregoing preparation for recording, after steps S200 to S206 are completed, if the video camera in accordance with the present embodiment receives a user-entered recording initiation instruction, the video camera can immediately initiate recording. On the other hand, when step S207 is executed, since preparation for recording is not normally completed, even if the user-entered recording initiation instruction is received, recording cannot be initiated.

Next, referring to FIG. 3, actions to be performed in a case where a user-entered recording initiation instruction is received will be detailed below.

First, a user instructs initiation of recording of video-audio data through the user interface 103. At step S300, the video camera in accordance with the present embodiment receives the video-audio data recording initiation instruction and initiates recording of video-audio data.

Thereafter, at step S301, whether video-audio data can be recorded is decided. Specifically, a decision is made on whether preparation for recording described in FIG. 2 is completed normally, whether a recording medium has an available space required at minimum for recording video-audio data, whether the recording medium is protected from being written, or whether a recording medium that has to be formatted has been formatted. If a decision is made that video-audio data can be recorded, control is passed to step S302. Recording video-audio data is initiated. A concrete processing sequence is as described previously. An iterative description will be omitted. Briefly, video-audio data is fetched, converted into a stream, and then written in a recording medium (herein, the HDD 108). Incidentally, recording of video-audio data is repeatedly executed by performing parallel operation. Namely, while recording continues, video-audio data is unintermittently received by the video camera, converted into a stream, and written in the recording medium. Consequently, step S302 in FIG. 3 shall be executed in parallel with steps S303 and S304.

At step S303, information on a recording medium is updated. Specifically, the system control unit 102 checks the amount of video-audio data recorded in a recording medium and the available space of the recording medium. Information on the result of the check is stored in a memory in order to update the last result of check. Further, the system control unit 102 updates information displayed on the OSD on the basis of the result of the check.

At step S304, whether an available space is still left in the recording medium is decided based on the result of the check performed at step S303. If the available space is still left, recording of video-audio data is continued. On the other hand, if the available space is not left, control is passed to step S305. Information signifying that video-audio data cannot be recorded is displayed in order to notify a user of the fact. Specifically, information "The available space of the HDD has run out." or "The capacity of the HDD is used up." is displayed on the OSD. Moreover, the step is executed even in a case where a decision is made based on the decision made at step S301 that video-audio data cannot be recorded. In this case, information "The HDD may be broken." or "Turn on the power supply again." is displayed on the OSD. After the completion of step S305, recording of video-audio data is terminated at step S306.

Incidentally, when a user instructs suspension of recording of video-audio data through the user interface 103, the video camera in accordance with the present embodiment suspends recording through recording suspension to be performed by the system control unit 102 and drive control unit 106. Specifically, even when the available space is still left in a recording medium, recording is suspended in response to a user-entered recording suspension instruction. For recording suspension, information on management of video-audio data is recorded or updated so that recording can be achieved smoothly at the next time, or processing is performed in order to allow reproduction of recorded video-audio data.

While recording of video-audio data is executed according to the foregoing method, if the amount of video-audio data becomes equal to a multiple of the capacity of the DVD 106, a user is notified of the fact through the OSD. This example will be detailed in conjunction with FIG. 4 to FIG. 7.

Figure 3:
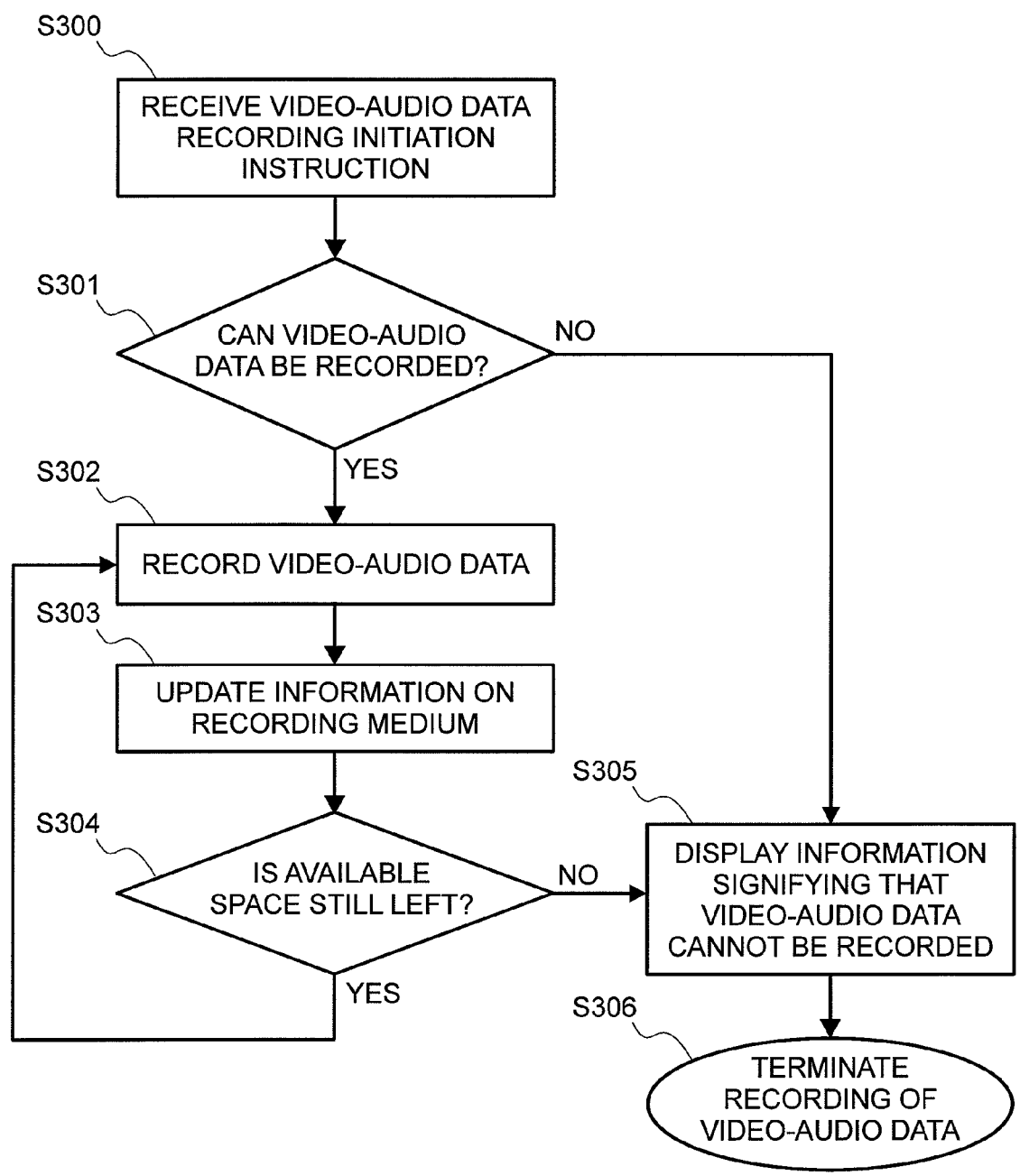
FIG. 3 shows an example of a processing flow for recording video-audio data.
Figure 4:
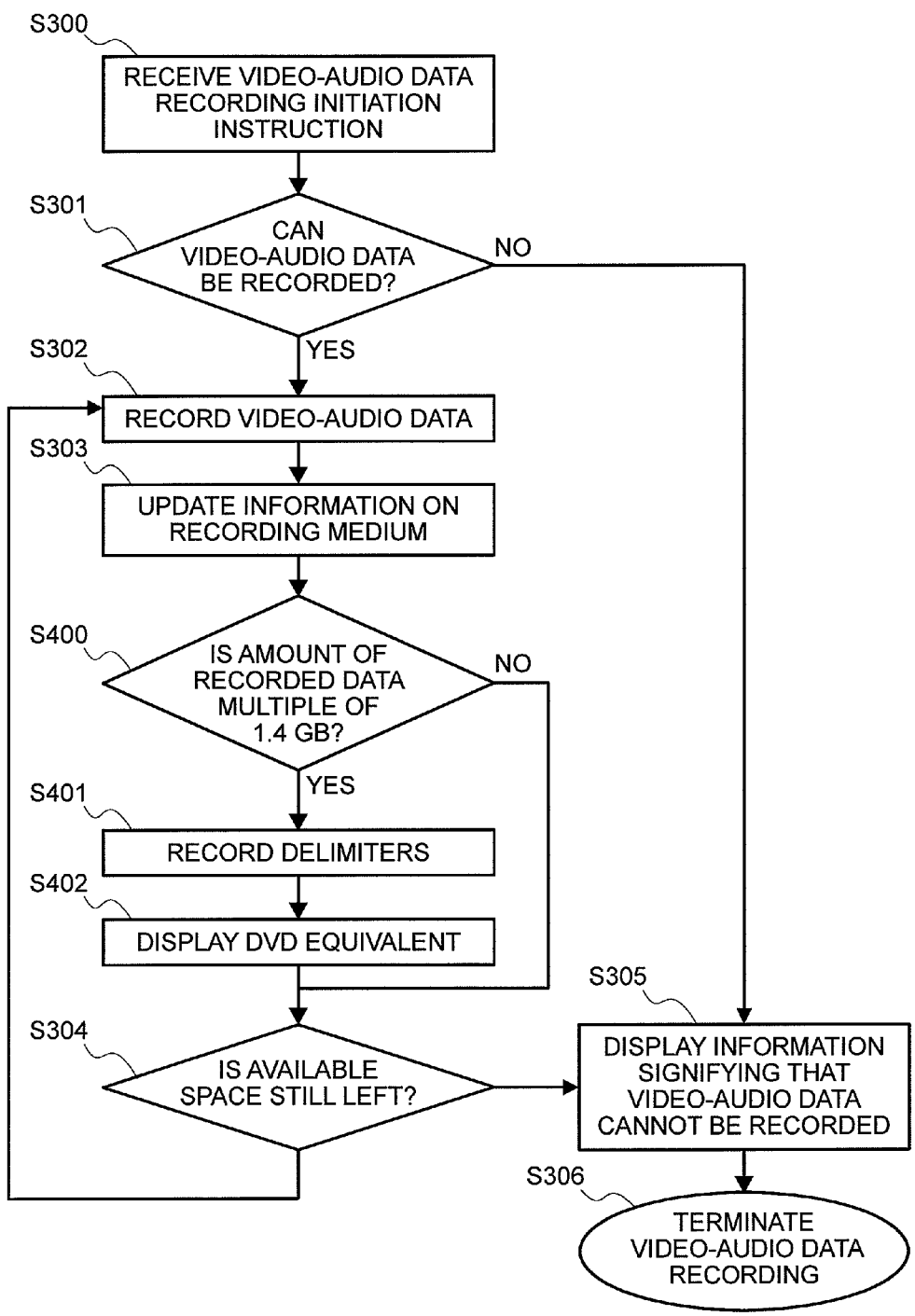
FIG. 4 shows an example of a processing flow for notifying a DVD equivalent.

FIG. 4 describes a sequence in which the processing from step S400 to step S402 is added to the video-audio data recording described in FIG. 3. During the video-audio data recording of step S302, the system control unit 102 monitors the amount of video-audio data recorded in the HDD 108. At step S400, the monitored amount of video-audio data recorded in the HDD 108 is checked to see if it is equal to a multiple of the capacity of one DVD 106. In the present embodiment, the storage capacity of the DVD 106 is supposed to be 1.4 gigabytes. The amount of video-audio data recorded in the HDD 108 is checked to see if it is equal to a multiple of 1.4 gigabytes, for example, 1.4 gigabytes, 2.8 gigabytes, 4.2 gigabytes, 5.6 gigabytes, or 7.0 gigabytes. When the result of the check demonstrates that the amount of video-audio data is equal to a multiple of 1.4 gigabytes, delimitative information is recorded at step S401. The delimitative information indicates what range of video-audio data, which is recorded in the HDD 108, is equivalent to which of DVDs, wherein an equivalent of the video-audio data is calculated in terms of the capacity of one DVD. Incidentally, the amount of video-audio data recorded in the HDD 108 is a multiple of 1.4 gigabytes. However, the amount of video-audio data need not be strictly an integral multiple of 1.4 gigabytes. The amount of video-audio data should preferably not exceed 1.4 gigabytes but an error of several percents shall be tolerated.

Figures 5, 6:
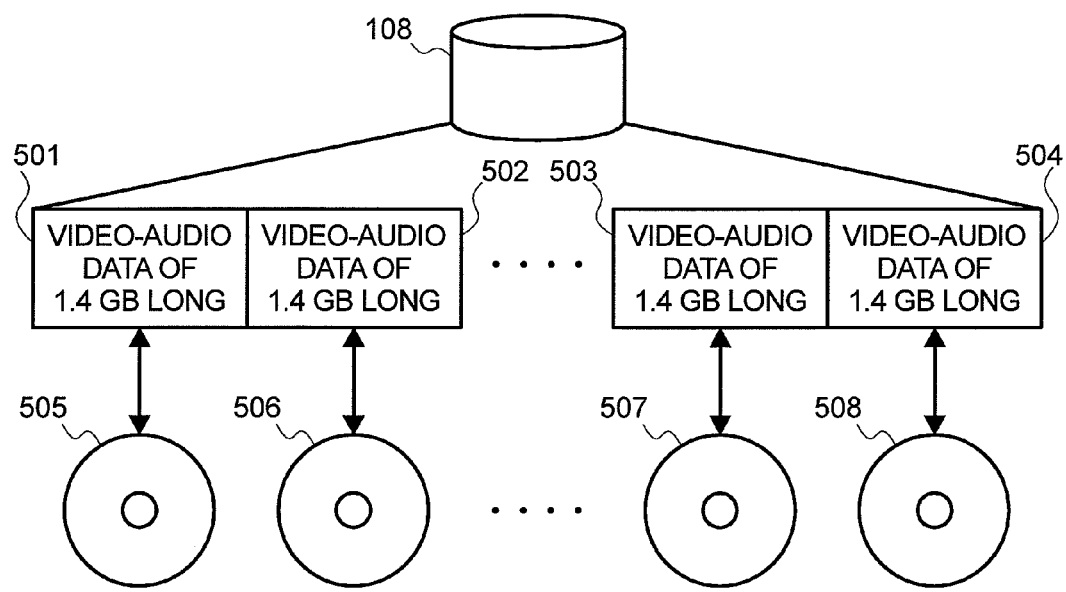
FIG. 5 shows an example of the concept of a DVD equivalent of data recorded in a HDD.
FIG. 6 shows an example of delimitative information.

A concrete example will be described in conjunction with FIG. 5. In FIG. 5, there is shown an HDD 108. Reference numerals 501 to 504 conceptually denote video-audio data items recorded in the HDD 108. Now, the video-audio data items 501 to 504 are delimited in units of 1.4 gigabytes. Consequently, the amount of each of video-audio data items 501 to 504 is equal to the capacity of one DVD. The video-audio data 501 can be associated with a DVD 505 having a capacity of 1.4 gigabytes. The video-audio data 502 can be associated with a DVD 506, the video-audio data 503 can be associated with a DVD 507, and the video-audio data 504 can be associated with a DVD 508. In other words, the video-audio data 501 is equivalent to the first DVD, that is, the DVD 505 in FIG. 5. The video-audio data 502 is equivalent to the second DVD, that is, the DVD 506 in FIG. 5. Consequently, delimitative information to be recorded at step S501 should indicate the start and end positions of video-audio data and signify to which of DVDs the video-audio data is equivalent. For example, as far as the video-audio data 502 is concerned, information indicating the start and end positions thereof and signifying that the video-audio data is equivalent to the second DVD is recorded. Otherwise, since the start position of the video-audio data 502 is identical to the end position of the video-audio data 502, as long as the end position of the video-audio data 501 is indicated, the start position of the video-audio data 502 may not be indicated.

Now, a method of recording delimitative information will be described below. As mentioned previously, delimitative information indicates the start and end positions of video-audio data and signifies to which of DVDs the video-audio data is equivalent. For example, as shown in FIG. 6, the delimitative information may be recorded in the form of a table in which values are associated with one another. Referring to FIG. 6, a row 601 indicates to which of DVDs each video-audio data is equivalent. A row 602 indicates a start position of video-audio data. A row 603 indicates an end position of video-audio data. The rows are associated with columns 604, 605, 606, and 607. For example, the column 605 signifies that video-audio data equivalent to the second DVD falls within a range from a start position "0:30:00" to an end position "1:00:00." A destination in which the table shown in FIG. 6 is recorded may be a memory incorporated in the system control unit 102 or may be the RAM 105. Further, the table may be recorded in the HDD 108. A unique file in which the table shown in FIG. 6 is recorded may be created. Namely, the information of the table should merely be stored in a place in which it will not be deleted even when the power supply of the video camera is turned on or off. The recording method is not limited to any specific one. However, the time required for reading or writing the table may vary depending on a recording place. Therefore, a recording place should be selected according to the requirements for a system. As other conceivable method, an entry point of video-audio data may be used to extend control.

Thereafter, at step S402, a DVD equivalent is displayed. Specifically, the number of DVDs to which video-audio data recorded in the HDD 108 is equivalent is displayed on the OSD. For example, in FIG. 5, when the amount of video-audio data 501 reaches 1.4 gigabytes, information saying "A motion picture equivalent to one DVD has been recorded." is displayed. Thereafter, recording is continued. When the amount of video-audio data 502 reaches 1.4 gigabytes, information saying "A motion picture equivalent to two DVDs has been recorded." is displayed on the OSD. FIG. 7 shows an example of display of the DVD equivalent. FIG. 7A shows an example of the display on the OSD attained when the video camera in accordance with the present embodiment is recording a motion picture. Information signifying that a motion picture mode is selected is displayed in the left upper part of the screen. Information on a recording medium (HDD) and recording image quality are displayed in the left lower part of the screen. Information signifying that recording is in progress, a recording time, and a remaining recording time are displayed on the right upper part of the screen. A time instant of imaging and a day, month, and year thereof are displayed on the right lower part of the screen. FIG. 7B shows an example in which a text saying that an amount of data representing a recorded motion picture is now equivalent to two DVDs is displayed on the OSD in order to notify a user of the fact. As illustrated, the text saying "A motion picture equivalent to two DVDs has been recorded." is displayed. FIG. 7C shows an example in which the fact that an amount of data representing a recorded motion picture is now equivalent to two DVDs is expressed with a conceptual graphic. As illustrated, the graphic expressing a disk and the number of disks (×2) are displayed under the remaining recording time on the right upper part of the screen of the OSD. An expressing method is not limited to the example shown in FIG. 7. For example, the number of graphics expressing disks may be incremented one by one along with an increase in the amount of data representing a recorded motion picture. Otherwise, the color of graphics expressing disks and being displayed in advance may be changed to another along with an increase in an amount of motion picture data in order to discriminate an unrecorded state from a recorded state. For example, when a motion picture has been recorded by 2.0 gigabytes, data is considered to have been recorded in the first DVD having a capacity of 1.4 gigabytes, and data is considered to be being recorded in the second DVD having a capacity of 1.4 gigabytes. Therefore, the first graphic expressing the recorded disk may be displayed in black, the second graphic expressing the disk being recorded may be flickered, and the third and succeeding graphics may be displayed in white.

After information display is executed at step S402, control is passed to step S304. The processing of step S304 and succeeding steps is as mentioned above. An iterative description will be omitted. Incidentally, the processing from step S302 to step S304 in FIG. 4 and the processing from step S400 to S402 shall be, similarly to the counterparts in FIG. 3, executed in parallel with each other as long as recording is continued. Namely, while a DVD equivalent is displayed, received video-audio data is converted into a stream and written in a recording medium.

If the result of check performed at step S400 demonstrates that the amount of video-audio data recorded in the HDD 108 being monitored is not equal to a multiple of the capacity of one DVD, step S401 and step S402 are not executed, but control is passed to step S304.

In the example described in FIG. 4, when an amount of recorded motion picture data reaches a multiple of 1.4 gigabytes that is the capacity of one DVD, delimitative information is recorded at step S400, and a DVD equivalent is displayed. For example, when the same processing is performed some time before the amount of recorded motion picture data reaches 1.4 gigabytes, user-friendliness improves. For realization of this processing, a control method to be implemented at step S400 is modified. For example, assuming that an amount of video-audio data recorded in the HDD 108 being monitored by the system control unit 102 reaches a predefined threshold, information is displayed in order to notify a user of the fact. As the threshold, an amount of video-audio data or a recording time during which video-audio data is recorded may be adopted. For example, in the former case, the threshold is 1.2 gigabytes. In the latter case, when video-audio data has been recorded with three minutes left, a user is notified of the fact. Needless to say, the threshold is not limited to the above examples but may be set to any value that can be easily treated. Moreover, a user may be able to designate the threshold through a menu screen image displayed on the video camera in accordance with the present embodiment.

The present embodiment has been described on the assumption that the storage capacity of one DVD is 1.4 gigabytes. When DVDs having a different storage capacity are employed, the value of 1.4 gigabytes should be modified. Control may then be extended according to the storage capacity of DVDs employed (optical disks). Further, the association of types of optical disks with maximum storage capacities may be complied in the form of a table and stored so that the value of a storage capacity can be automatically changed for each type of optical disk recognized or entered. The value of 1.4 gigabytes may be modified in line with the type of inserted optical disk, and control may be extended based on the storage capacity of the optical disk. The number of layers constituting each DVD may be specified in the table in order to cope with DVDs each having multiple layers. Moreover, Blu-ray disks or high-definition DVDs may be adopted. Moreover, the diameter of a DVD is not limited to 8 cm. Irrespective of the storage capacity of a DVD, a notification may be issued when an amount of recorded data becomes equal to a user-desired amount of data. Moreover, removable semiconductor memories or removable HDDs (information versatile disks for removable usage (iVDR) or the like) may be adopted instead of optical disks.

As described above, in the video camera in accordance with the present embodiment, while video-audio data is being recorded in the HDD 108, when the amount of recorded video-audio data becomes equal to a multiple of the storage capacity of the DVD 106, a user is notified of the fact. This is advantageous because the user can learn the number of DVDs 106, to which the video-audio data recorded in the HDD 108 is equivalent, during recording. Consequently, the user can easily learn how many DVDs 106 the user has to prepare for the purpose of dubbing the video-audio data recorded in the HDD 108 thereto. This is user-friendly.

Further, when a user is notified before an amount of recorded data becomes equal to the storage capacity of one DVD, the user thinks that video-audio data which will soon be able to be delimited has to be stored. Namely, during recording of video-audio data in the HDD 108, the user continues imaging while predicting to dub the recorded video-audio data into the DVD 106. Consequently, the recorded video-audio data is constructed to have introduction, development, turn, and conclusion without being edited. The user should therefore merely dub the recorded video-audio data. When this usage is adopted, the video camera having the HDD will be found user-friendly. When a medium in which a large amount of video-audio data can be recorded, such as, the HDD is employed, a user tends to accumulate data in the HDD. As a result, the user is thought to merely dub recorded video-audio data into a DVD without editing the video-audio data.

Figure 8:
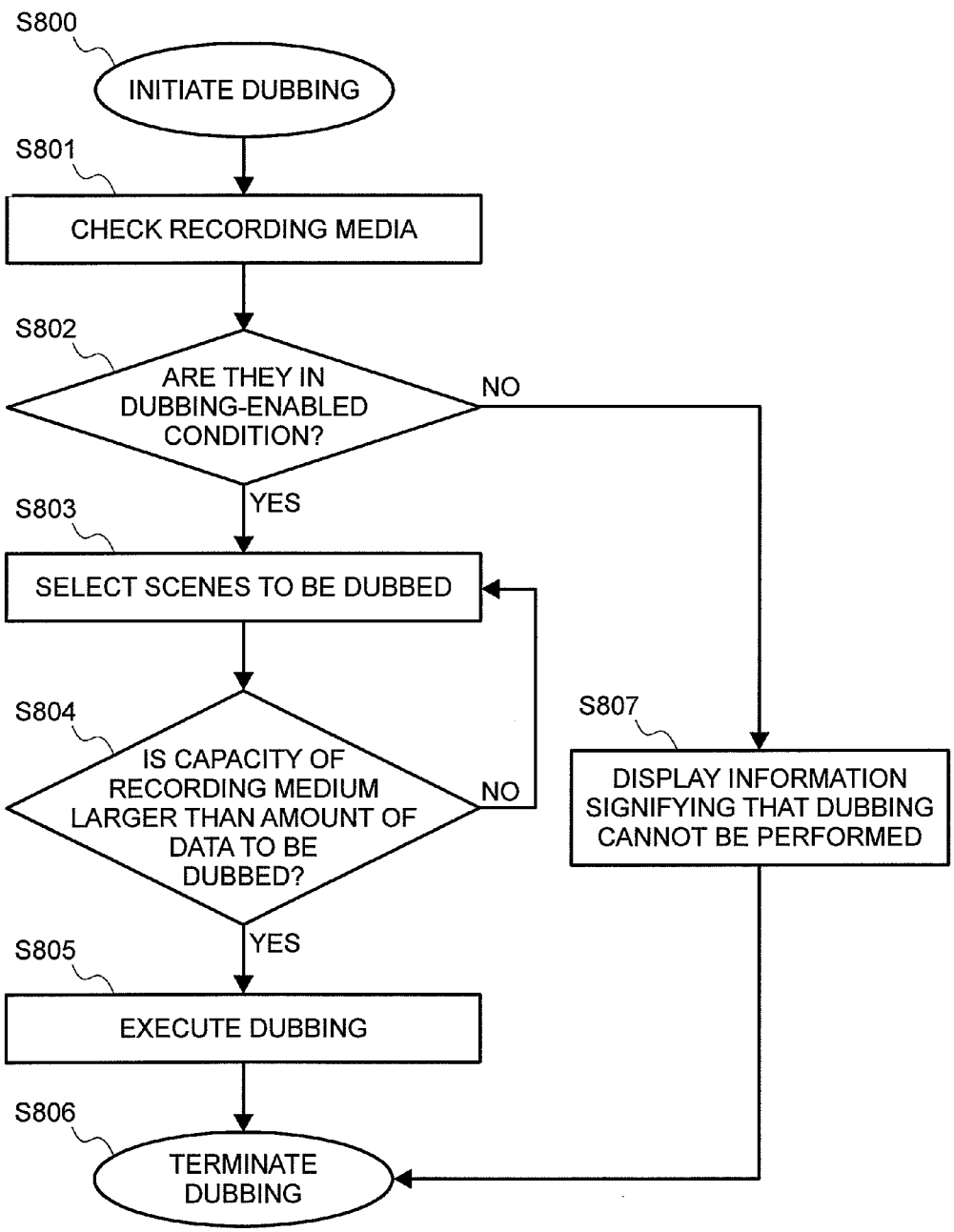
FIG. 8 shows an example of a processing flow for dubbing.

Now, dubbing will be described in conjunction with FIG. 8. The video camera in accordance with the present embodiment includes two recording media, that is, the DVD 106 and HDD 108. Consequently, video-audio data recorded in one of the recording media can be dubbed into the other recording medium. At step S800, the system control unit 102 receives a dubbing initiation instruction from a user via the user interface 103. At step S801, the system control unit 102 checks the condition of the HDD 108 that is a recording medium serving as a dubbing source and the condition of the DVD 106 that is a recording medium serving as a dubbing destination. At step S802, a decision is made on whether the result of the check of step S801 demonstrates that data can be dubbed to or from the two recording media. When a decision is made that data can be dubbed to or from the two recording media, scenes to be dubbed are selected from video-audio data recorded in the HDD 108, which is the recording medium serving as a dubbing source, at step S803. At step S804, the sum of amounts of data items representing the scenes selected at step S803 is compared with the capacity of the dubbing-destination recording medium. If the result of step S804 demonstrates that the capacity of the dubbing-destination recording medium is equal to or larger than the sum of amounts of data items representing the scenes to be dubbed, control is passed to step S805. Dubbing is then executed. After the execution of dubbing, the dubbing is terminated at step S806. On the other hand, if a decision is made at step S802 that data cannot be dubbed to or from the recording media, control is passed to step S807. Information saying that data cannot be dubbed to or from the recording media is displayed on the OSD. At step S806, processing is terminated. If the result of the check of step S804 demonstrates that the capacity of the dubbing-destination recording medium falls below the sum of amounts of data items representing scenes to be dubbed, dubbing cannot be executed. Scenes to be dubbed are selected again at step S803. Needless to say, control may be passed to step S806 in order to terminate dubbing.

For dubbing, delimitative information recorded during recording of a motion picture is referenced in order to execute dubbing. For example, the column 604 in FIG. 6 indicates points in video-audio data, which is recorded in the HDD 108, at which the video-audio data is delimited as an equivalent to the first DVD. When dubbing is executed based on the delimitative information, DVD data can be readily produced. The produced DVD data has the contents which a user has predicted during recording. Therefore, the necessity of the labor for editing is obviated, and this will be found user-friendly. Moreover, since dubbing is executed based on the delimitative information, dubbing can be achieved readily. Moreover, since the labor for editing is unnecessary, even a user unfamiliar with manipulations to be performed for dubbing or editing can readily produce the same DVD data as the one the user has predicted.

Figure 9:
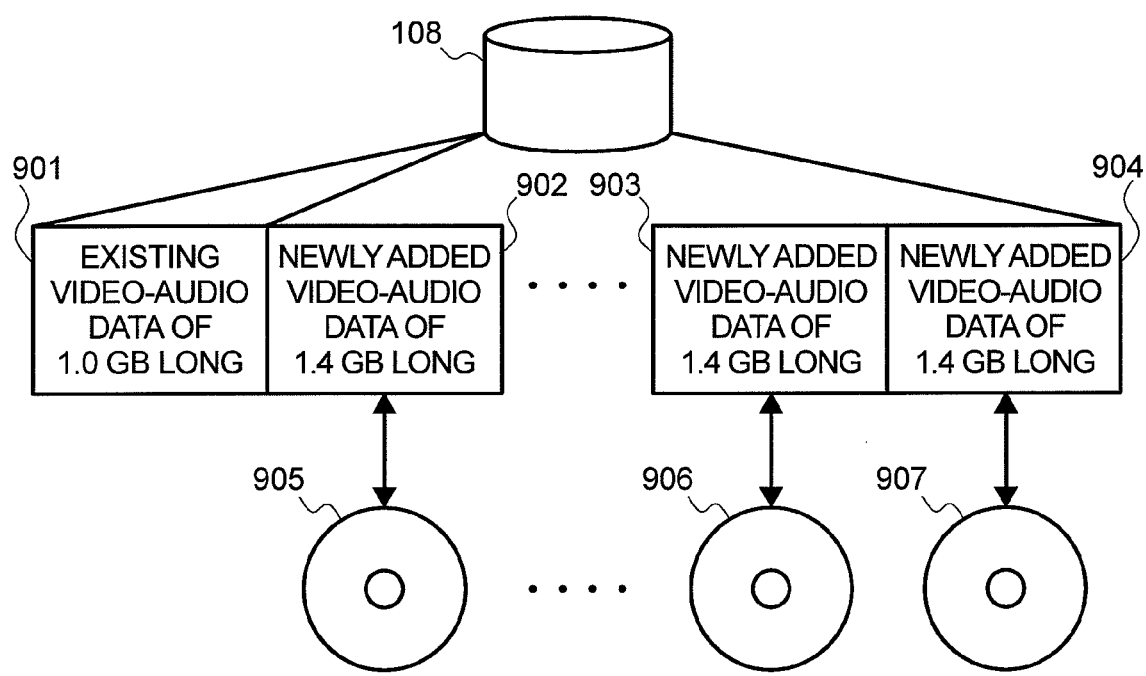
FIG. 9 shows an example of the concept of a DVD equivalent of data in a HDD in which video-audio data already exist.

Recording or dubbing of video-audio data has been described on the assumption that no data exists in the HDD 108 which is a recording medium. However, in reality, a case where data already exists in the HDD is likely to occur. For example, a case shown in FIG. 9 is conceivable. In the case shown in FIG. 9, video-audio data items 901 to 904 shall be recorded in the HDD 108. Among the data items, the video-audio data 901 shall be existing video-audio data of 1.0 gigabyte long, and left alone by a user. The video-audio data items 902 to 904 are video-audio data items newly added to the HDD 108 in which the video-audio data 901 already exists. In this case, supposing the newly added video-audio data items alone other than the existing video-audio data 901 can be dubbed into a DVD, it will be user-friendly. For this control, for example, a date concerning video-audio data is employed. A detail will be presented below in conjunction with FIG. 10.

FIG. 10 is identical to FIG. 4 except that steps S1000 and S1001 are added to the processing flow described in FIG. 4 and that step S400 is replaced with step S1002. Only differences from the description in FIG. 4 will be described below. First, at step S1000, a date is designated in order to specify the date in a form predefined for the control sequence. For video-audio data recorded in, for example, Jan. 1, 2006, the designated date is used to display a DVD equivalent of the video-audio data being recorded and to designate associated delimitative information. When not only a day, month, and year but also a time instant is employed, control can be extended in more details. Moreover, step S1000 may be executed prior to step S300. Thereafter, video-audio data is recorded at step S302 and thereafter. At step S1001 executed during recording, the system control unit 102 updates and manages an amount of video-audio data recorded on a date designated at step S1000. At step S1002, the amount of video-audio data recorded on the designated date is checked to see if it is equal to a multiple of the capacity of one DVD 106. If the amount of video-audio data recorded on the designated date is equal to a multiple of the capacity of one DVD 106, delimitative information is recorded at step S401, and a DVD equivalent is displayed at step S402. At this time, when the designated date is appended to the DVD equivalent and information saying "A motion picture equivalent to one DVD has been recorded on Jan. 1st, 2006." is displayed, it will be found user-friendly. Moreover, the date designated at step S1000 may be appended to the delimitative information.

As mentioned above, even when the video-audio data 901 already exists in the HDD 108, the advantage of the present embodiment is provided owing to the use of a date. When the date is used for dubbing, only video-audio data recorded on a user-designated day can be readily dubbed into a DVD.

The present embodiment has been described on the assumption that the MPEG2 format is adopted as a motion picture recording format. The recording format is not limited to the one, but, for example, the MPEG4 format may be adopted. Moreover, still images can also be recorded in some types of recording media. In this case, data is recorded according to the joint photographic experts group (JPEG) format.

According to the aforesaid pieces of means, for example, a user can recognize the number of second media to which an amount of video-audio data recorded in a first medium is equivalent. The user can easily learn how many second media the user has to prepare for dubbing of video-audio data. The user will find it friendly.

While we have shown and described several embodiments in accordance with out invention, it should be understood that disclosed embodiments are susceptible to changes and modifications without departing from the scope of the invention. Therefore, we do not intend to bound by the details shown and described herein, but intend to cover all such changes and modifications as fall within the ambit of the appended claims.

What is claimed is:

1. A data recording apparatus that has a plurality of recording media incorporated therein and records video-audio data in the recording media, comprising:
   a monitor module which monitors the recording capacities of the recording media; and
   a display module on which data is displayed, wherein:
   when the monitor module senses during recording of the video-audio data in the first recording medium that an amount of video-audio data recorded in the first recording medium corresponds to an integral multiple of the storage capacity of the second recording medium, the display means displays information signifying that the amount of video-audio data recorded in the first recording medium becomes equal to a multiple of the storage capacity of the second medium.

2. The data recording apparatus according to claim 1, wherein when the amount of video-audio data recorded in the first recording medium becomes equal to an integral multiple of the storage capacity of the second recording medium, information associating the video-audio data recorded in the first recording medium with the storage capacity of the second recording medium is recorded.

3. The data recording apparatus according to claim 1, wherein when the monitor module senses that the amount of video-audio data recorded in the first recording medium becomes equal to the storage capacity of the second recording medium, an amount of video-audio data equivalent to the second recording medium is delimited as a unit.

4. The data recording apparatus according to claim 1, wherein the second recording medium can be unloaded from the data processing apparatus, and the storage capacity of the second recording medium is smaller than the storage capacity of the first recording medium.

5. The data recording apparatus according to claim 1, 1, wherein the display means displays the number of second recording media to which the amount of video-audio data recorded in the first recording medium is equivalent.

6. The data recording apparatus according to claim 2, wherein dubbing is performed based on the information associating the video-audio data recorded in the first recording medium with the storage capacity of the second recording medium.

7. The data recording apparatus according to claim 1, further comprising a date designation module which designates a date, wherein:
   an amount of video-audio data recorded in the first recording medium on a day designated by the date designation module is monitored;
   when a decision is made that the monitored amount of video-audio data corresponds to an integral multiple of the storage capacity of the second recording medium, information signifying that the amount of video-audio data recorded in the first recording medium on the day designated by the date designation module becomes equal to an integral multiple of the storage capacity of the second recording medium is displayed on the display means.

* * * * *